March 23, 1926.
D. P. DALMAS
CAN PERFORATING DEVICE
Filed Feb. 16, 1925
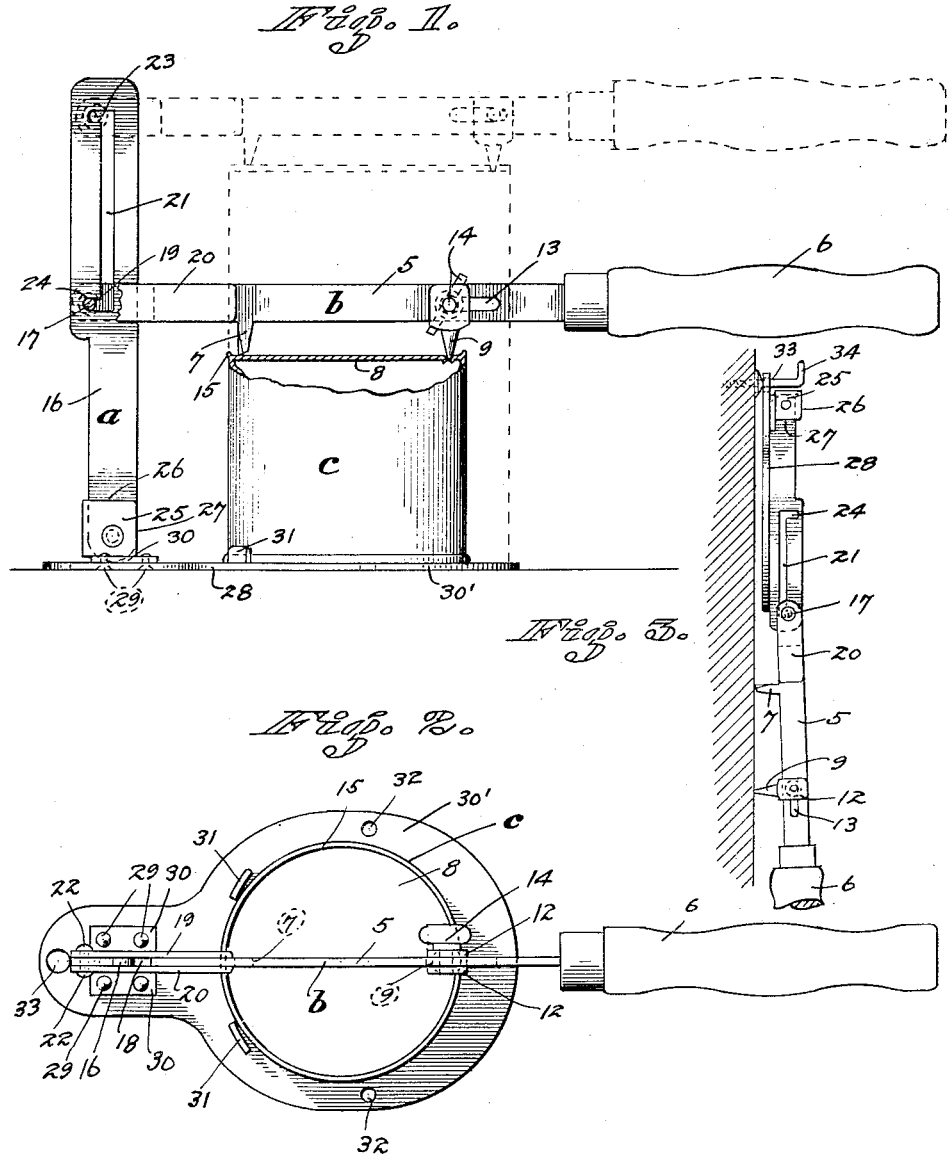
INVENTOR.
DANIEL P. DALMAS
BY
ATTORNEYS.

Patented Mar. 23, 1926.

1,577,957

UNITED STATES PATENT OFFICE.

DANIEL P. DALMAS, OF VALLEJO, CALIFORNIA.

CAN-PERFORATING DEVICE.

Application filed February 16, 1925. Serial No. 9,569.

*To all whom it may concern:*

Be it known that I, DANIEL P. DALMAS, a citizen of the United States, and a resident of Vallejo, in the county of Solano and State of California, have invented a new and useful Improvement in Can-Perforating Devices, of which the following is a specification.

The present invention relates broadly to kitchen utensils and has a specific reference to devices of that kind for forming outlet and vent openings in cans or containers for condensed milk, evaporated cream, vegetable oil, syrup and the like.

The general object of the invention is to provide a utensil usable with cans of various heights, diameters or capacities, and of comparative simple construction and adapted for easy adjustment into operative relation with a can to provide the same with vent and outlet openings simultaneously and in one operation. Other objects will appear and will be better understood from one embodiment of my invention of which the following is a specification, reference to be made to the accompanying drawings forming a part of the specification and in which—

Figure 1 is a side elevation of the utensil in use, parts thereof being broken away to disclose the construction and relation of other parts and showing by full and dotted lines the adjustable features of the invention.

Figure 2 is a plan view of Figure 1, and

Figure 3 is a fragmentary side elevation showing the collapsible or foldable features of the device.

The device of the present invention comprises a supporting frame designated generally by $a$ and an operating lever indicated generally by $b$. The operating lever is constructed so as to be arranged in operative relation to the can $c$ and constructed so as to pierce or perforate oppositely disposed portions of the can and thereby provide the same with vent and outlet openings. The shank or body 5 of operating lever $b$ is, for purposes of illustration, shown as being formed of metal and provided at one end with a handle or grip 6 of ordinary construction which is suitably connected to the shank 5 in any well known manner as by having a recess, not shown, into which one end portion of the shank is inserted. The gauge of the metal from which the shank 5 is formed is sufficient to resist bending under the force necessary to operate the lever $b$ to penetrate the metal of a can. From the drawings it will be noted that the shank or body 5 is relatively long and thin for the purpose of achieving a light weight structure and is disposed so that the force necessary to effect the operation will be directed transversely of the narrow dimension of the shank 5. A perforating element or tooth 7 is formed with or otherwise suitably secured to the shank 5 so as to depend therefrom. The terminal of this tooth is relatively sharp so as to readily penetrate the metal of the head 8 of can $c$. A tooth 9 is also connected to the shank 5 and arranged in spaced relation to the tooth 7. Tooth 9 like tooth 7 is constructed so as to readily penetrate the head 8 and the intervening space between the terminals of the said teeth 7 and 9 is such that the teeth penetrate opposite portions of the can and thereby operate simultaneously to provide the required outlet and vent openings in the head 8 or such other part of the can as the teeth may be caused to operate upon. In that the classes of cans with which this invention is intended for use vary in point of diameter, it is found desirable to permit of varying the distance between the teeth 7 and 9 to compensate for the said variations in the cans. A simple and effective structure for carrying out this result is had by providing tooth 9 with a connection for shank 5 and further in adapting the said shank so that tooth 9 may be adjusted longitudinally thereof. In the drawings I have shown tooth 9 terminating in a U-shaped extension the sides of which are indicated by 12, 12 so as to provide an intervening recess adapted to nicely receive shank 5. A longitudinal slot 13 is formed in shank 5 and a clamping screw 14 is screwed into threaded openings in the sides 12, 12 passing through the slot 13. The slot 13 is so proportioned and disposed with respect to tooth 7 that the intervening space between the teeth 7 and 9 will correspond to the distance required between the vent and outlet openings of a relatively small can when the tooth 9 is adjusted so that screw 14 is at that end of the slot nearest tooth 7, all of which is shown by full lines in Figure 1. In that figure it will be noted that the openings to be made by the teeth 7 and 9 are adjacent to the periphery 15 of the head 8 of can $c$. In an instance where a can corresponding in height but of greater diameter than can $c$ is to be perforated, tooth 9 will then be adjusted for the required distance to the right so that when the vent and outlet openings are formed in the can of larger diameter such openings will occupy the same relative positions as those formed in a can of the size shown by full lines in Figure 1.

A normally upright standard 16 of supporting frame $a$ is connected to the operating lever $b$ by a pivot 17 which is herein shown for purposes of illustration as passing through a recess 18 in the end portion of the shank remote from handle 6. In the present instance I have shown recess 18 as constituting a space intervening between two plates 19 and 20 fixedly secured in any suitable manner to the shank 5. A longitudinal slot 21 is formed in the standard 16. This slot receives pivot 17 the ends of which are upset as indicated by 22 to prevent displacement and the ends of the slot terminating in angular extensions 23 and 24. The lower extension 24 is a trifle greater in length than extension 23 so that when tooth 9 is adjusted as shown in Figure 1, the head 8 of the can will be perforated thereby at the place indicated in that figure of the drawings. Standard 16 is formed of metal corresponding approximately in gauge with that of shank 5 and in point of height constructed so as to exceed that of the tallest can for which the device of this invention may be required to perforate. In carrying out this design and construction for the standard, the dimensions of slot 21 are such as to permit pivot 17 when withdrawn from extension 24, as shown in full lines in Figure 1, to be moved bodily upward with operating handle 5 through the slot and into extension 23. The latter extension is so disposed as to permit teeth 7 and 9 engaging with the opposite desirable portions to be perforated in a relatively taller can of greater diameter than the can shown by full lines in Figure 1, all of which will be observed by referring to the dotted lines shown in Figure 1 where it will be noted that tooth 9 is adjusted to that end of recess 13 remote from tooth 7. It will also be observed that when the parts are adjusted as shown by dotted lines as in Figure 1, pivot 17 bears on the inner end of extension 23 which is shorter than extension 24 as previously stated. One end of standard 16 is disposed in a socket 25 herein shown as being formed of a piece of metal bent so as to be substantially U-shaped in horizontal cross-section as viewed in Figures 1 and 2 to provide an open upper end 26 and an open inner side 27. This construction permits of adjusting the standard 16 to its operative upright position as shown in Figure 1 and folding the same downwardly as shown in Figure 3. The socket 25 is suitably secured to base 28 as by rivets 29 which pass through lateral lugs 30 forming extensions of the sides of the socket and through openings in base 28. When the present device is to be used in a private kitchen in which place its use will be relatively seldom, base 28 may be constructed as shown in the drawings where it will be noted by referring to Figure 2 that an enlarged extension 30' is provided so as to provide a foot for supporting frame $a$ and at the same time a bearing for the can $c$. Upstanding curved stop lugs or ears 31 are fixedly secured to the portion 30 and are arranged on a curved line so as to provide stops for the can $c$ shown by full lines in Figures 1 and 2. The lugs 31 are arranged on a curved line, the radius of which is longer than that of the can indicated by full lines in Figures 1 and 2. This construction permits of properly adjusting a can of larger diameter on the base as the can shown by dotted lines in Figure 1. Suitable openings 32 are provided in the base to receive fastening screws to screw the base to a table, shelf, or the like in cases where it is desired to have the device in constant set-up position. In instances where periodic use of the device is such that would make it more desirable to have the device placed aside when not in use, the construction of socket 25 will permit of standard 16 being folded over base 28 and parallel therewith and operating shank 5 adjusted so that pivot 17 will occupy that end of the slot farthest from socket 25. When the parts are so arranged in folded position the device may be readily hung up by passing the perforated end portion 33 over hook 34 extending from a board or wall, all of which is shown in Figure 3.

From the foregoing the operation of the device will be readily understood and it will be seen that in instances where the base 28 is secured to a table, shelf or the like, the said base is susceptible of modification. So too are the other parts of the device susceptible of certain modifications, constructions, and arrangements within the scope of the appended claims.

I claim:

1. A utensil for forming vent and outlet openings in a can or the like and comprising a base, a standard pivotally connected to the base and adjustable to an upright position with respect to the base and foldable over the base, and an operating lever having spaced perforating teeth and pivotally connected to the standard and adjustable to a position in angular relation to the standard when the latter is arranged upright with respect to the base.

2. A utensil for forming vent and outlet openings in a can or the like and comprising a base, a standard pivotally connected to the base and adjustable to an upright position with respect to the base and foldable over the base, an operating lever having spaced perforating teeth and pivotally connected to the standard and adjustable to a position in angular relation to the standard when the latter is arranged upright with respect to the base, and further adjustable to a position substantially coextensive with the standard when the same is folded over the base.

3. A utensil for forming vent and outlet openings in a can or the like and comprising a base adapted to form a bearing surface for the can to be perforated and having stops for holding the can positioned on the base, a standard pivotally connected to and foldable over the base and an operating lever pivotally connected to the standard and having perforating teeth adapted to penetrate a can positioned on the base, said standard and lever having pin and slot connections for permitting the lever to be adjusted vertically and bodily.

DANIEL P. DALMAS.